US012485680B2

(12) United States Patent
Matsuura

(10) Patent No.: US 12,485,680 B2
(45) Date of Patent: Dec. 2, 2025

(54) PRINTING APPARATUS, PRINTING METHOD AND MEDIUM

(71) Applicant: BROTHER KOGYO KABUSHIKI KAISHA, Nagoya (JP)

(72) Inventor: Kazunari Matsuura, Komaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 15 days.

(21) Appl. No.: 18/468,105

(22) Filed: Sep. 15, 2023

(65) Prior Publication Data

US 2024/0092091 A1 Mar. 21, 2024

(30) Foreign Application Priority Data

Sep. 15, 2022 (JP) ................................ 2022-147137

(51) Int. Cl.
*B41J 3/407* (2006.01)
*B41J 15/04* (2006.01)

(52) U.S. Cl.
CPC ........... *B41J 3/4075* (2013.01); *B41J 15/042* (2013.01); *B41J 15/046* (2013.01)

(58) Field of Classification Search
CPC ....... B41J 3/4075; B41J 15/042; B41J 15/046
See application file for complete search history.

(56) References Cited

U.S. PATENT DOCUMENTS

| | | | | |
|---|---|---|---|---|
| 2005/0086394 | A1* | 4/2005 | Kitada | G06F 3/123 710/1 |
| 2005/0237587 | A1* | 10/2005 | Nakamura | H04N 1/3877 358/527 |
| 2011/0310138 | A1* | 12/2011 | Mano | B41J 19/202 347/5 |
| 2012/0288312 | A1* | 11/2012 | Seki | B41J 3/4075 400/76 |
| 2019/0163414 | A1* | 5/2019 | Ishii | H04N 1/2353 |
| 2019/0168522 | A1* | 6/2019 | Akahane | B41J 15/16 |
| 2019/0291478 | A1* | 9/2019 | Ozawa | B41J 11/703 |
| 2019/0291479 | A1* | 9/2019 | Katou | B41J 11/703 |
| 2020/0307280 | A1* | 10/2020 | Kitagishi | B41J 15/16 |

FOREIGN PATENT DOCUMENTS

| | | |
|---|---|---|
| JP | 2006007710 A | 1/2006 |
| JP | 2019043562 A | 3/2019 |

* cited by examiner

*Primary Examiner* — David H Banh
(74) *Attorney, Agent, or Firm* — Scully, Scott, Murphy & Presser, PC

(57) ABSTRACT

There is provided a printing apparatus including: a holder configured such that a print medium wound in a roll shape is to be attached to the holder; a printer configured to perform printing on the print medium; a memory configured to store print condition information indicating a print condition regarding the print medium attached to the holder; and a controller configured to execute a processing of printing the print condition information on a condition print area of a single line or a plurality of lines on the print medium by using the printer.

9 Claims, 12 Drawing Sheets

PRINTING APPARATUS, PRINTING METHOD AND MEDIUM

REFERENCE TO RELATED APPLICATIONS

This application claims priority from Japanese Patent Application No. 2022-147137 filed on Sep. 15, 2022. The entire content of the priority application is incorporated herein by reference.

BACKGROUND ART

There is a known printing apparatus which performs printing with respect to label paper in which a plurality of labels is affixed to a mount. Such label paper is formed to have a roll shape, and the label paper having the roll shape is accommodated in a roll paper accommodating part of the printing apparatus before the printing is performed.

DESCRIPTION

There are many cases wherein the roll-shaped label paper is replaced, depending on the usage of the labels. In the above-described conventional technique, however, there is such a problem that in a case that the label paper is once accommodated in the roll paper accommodating part, it is difficult to grasp the kind (type) of the label paper. Since a variety of kinds of print conditions are set depending on the kind of a print medium in the printing apparatus, the print condition cannot be set appropriately if the kind of the print medium is erroneously recognized. Due to this, there arises such an inconvenience that the print condition is to be set again and/or that the print quality is lowered, etc.

In view of the above-described situation, an object of the present disclosure is to provide a printing apparatus, a printing method and a medium in each of which print condition information is easily grasped.

According to an aspect of the present disclosure, there is provided a printing apparatus including:

- a holder configured such that a print medium wound in a roll shape is to be attached to the holder;
- a printer configured to perform printing on the print medium;
- a memory configured to store print condition information indicating a print condition regarding the print medium attached to the holder; and
- a controller configured to execute a processing of printing the print condition information on a condition print area of a single line or a plurality of lines on the print medium by using the printer.

According to the present disclosure, since the print condition information is printed in the condition print area of a single line or a plurality of lines on the print medium, it is easy to grasp the print condition information. The print condition information may be read in a case of replacing the medium. By doing so, it is possible to easily and appropriately set the print condition. Further, the print condition information may be printed on the condition print area based on a shape and/or a size of the print medium. This enables the user to easily and visually grasp the print condition information, compared to a case that the print condition information is printed on the condition print area, not based on the shape and/or the size of the print medium.

According to the present disclosure, it is possible to provide a printing apparatus, a printing method and a medium in each of which print condition information corresponding to the label paper is easily grasped.

In the following, a printing apparatus according to an embodiment of the present disclosure will be explained, with reference to the drawings. The printing apparatus to be explained below is merely an embodiment of the present disclosure. Accordingly, the present disclosure is not limited to or restricted by the following embodiment, and any addition, deletion and/or change is/are possible within a range not departing from the spirit of the present disclosure.

Figure 1:
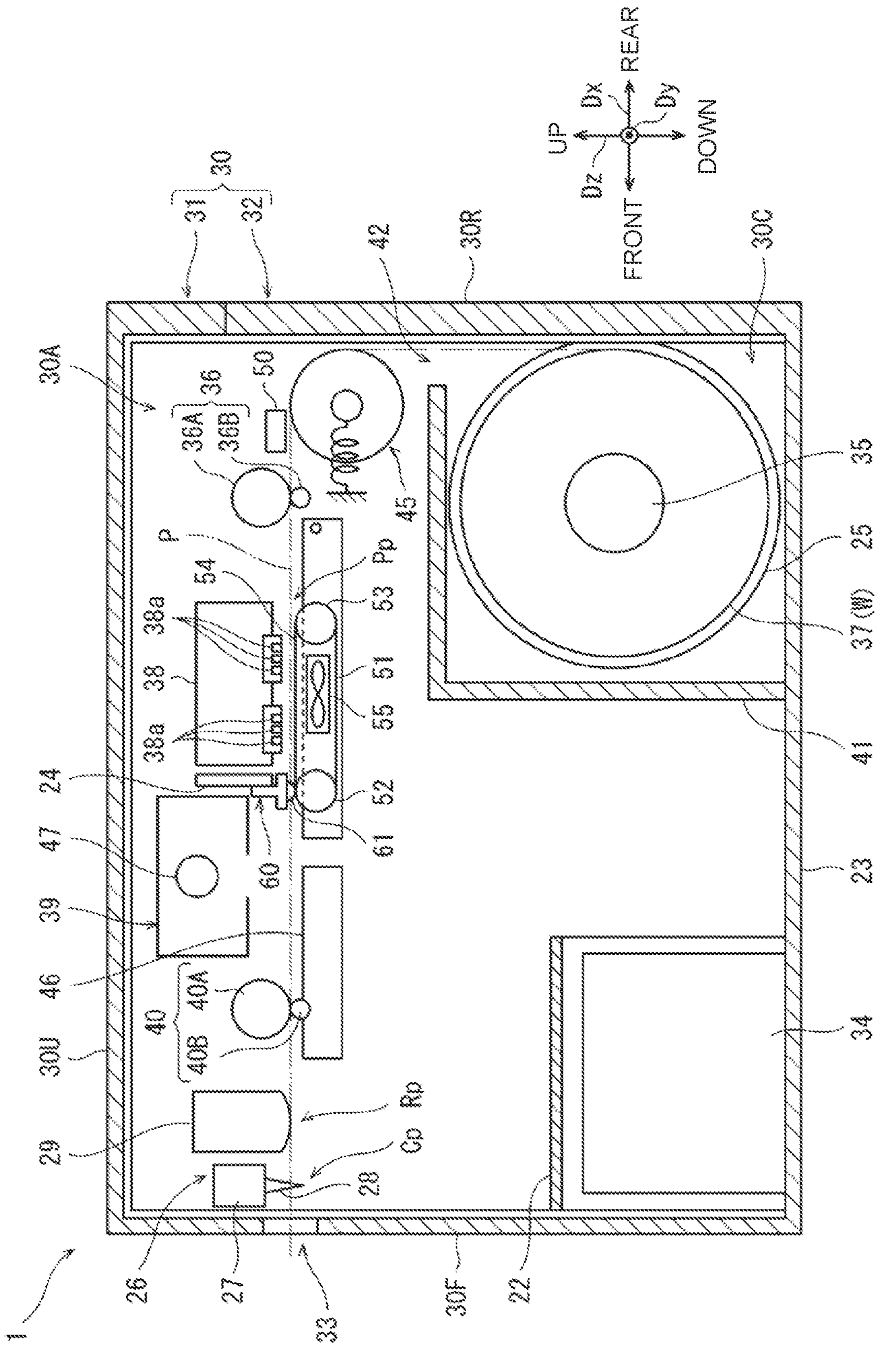
FIG. 1 is a cross-sectional view depicting a printing apparatus.
Figure 2:
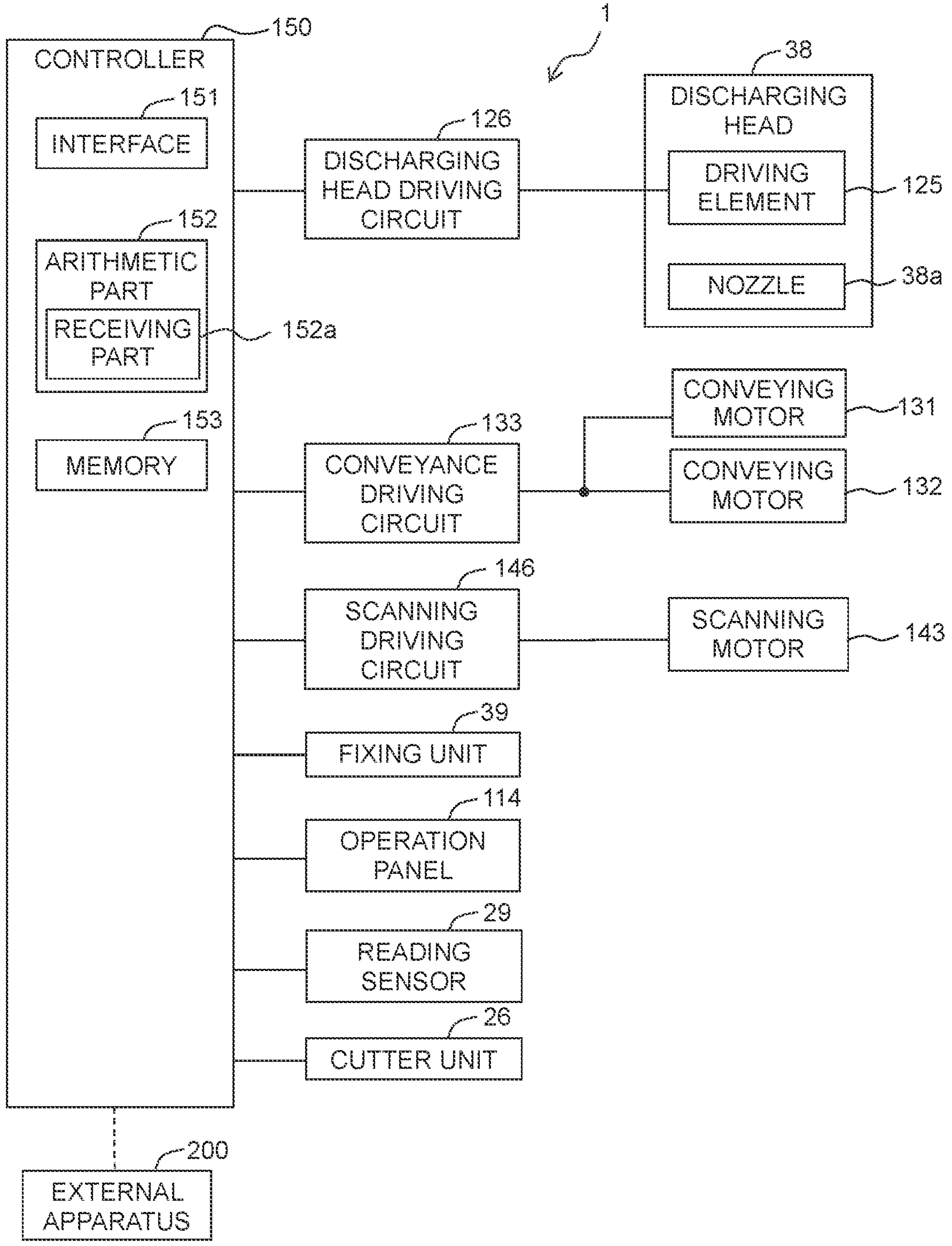
FIG. 2 is a block diagram depicting the configuration of a control system of the printing apparatus of FIG. 1.
Figure 3:
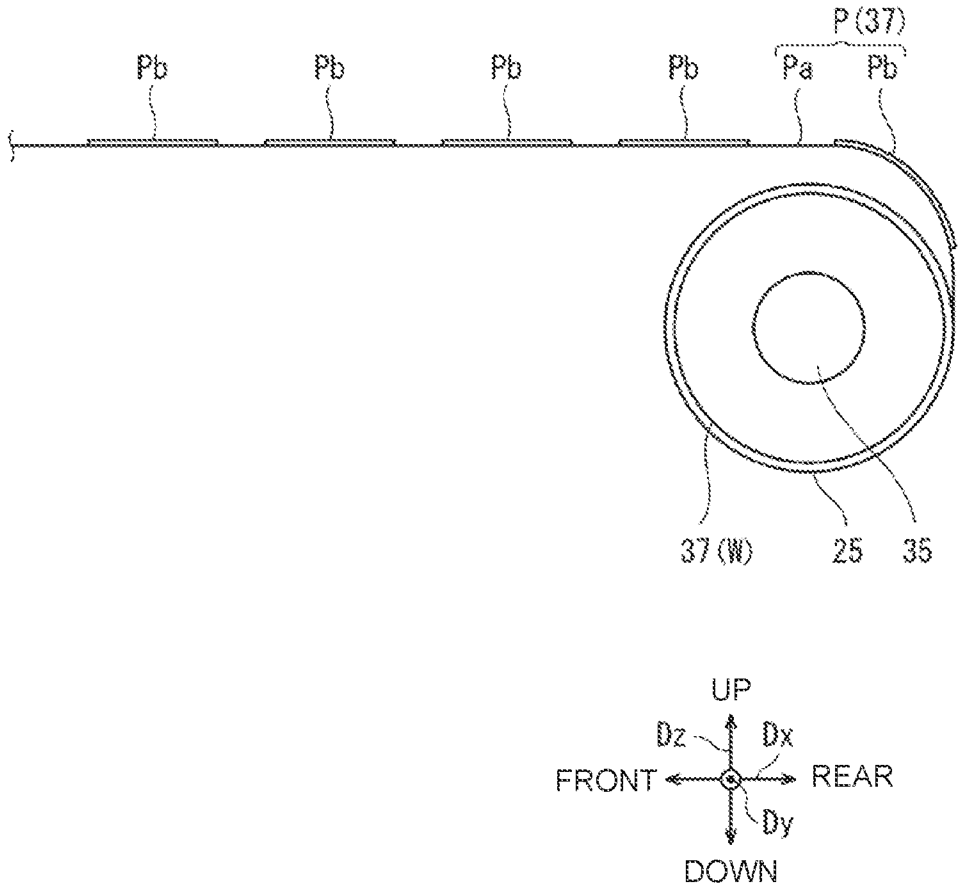
FIG. 3 is a view depicting the configuration of a roll paper as an example of a print medium.

FIG. 1 is a cross-sectional view depicting a printing apparatus 1 according to an embodiment. FIG. 2 is a block diagram depicting the configuration of a control system of the printing apparatus 1 of FIG. 1. FIG. 3 is a view depicting the configuration of a roll paper 37 as an example of a print medium W. In FIG. 1, directions which are mutually orthogonal are referred to as a first direction Dx, a second direction Dy and a third direction Dz. In the present embodiment, for example, the first direction Dx is the front-rear direction, the second direction Dy is the left-right direction and the third direction Dz is the up-down direction. In the following explanation, the first direction Dx is referred to as the front-rear direction Dx, the second direction Dy is referred to as the left-right direction Dy and the third direction Dz is referred to as the up-down direction Dz.

As depicted in FIG. 1, the printing apparatus 1 is an ink-jet printer which prints an image on label paper (label sheet, label paper sheet) P. The printing apparatus 1 is provided with a casing 30. The casing 30 has an upper casing 31 and a lower casing 32. Each of the upper casing 31 and the lower casing 32 has, for example, a shape of a rectangular parallelepiped, and is placeable on a desktop.

A discharge port 33 extending in the left-right direction Dy is provided on a front surface 30F of the casing 30. The discharge port 33 communicates an internal space 30A of the casing 30 with the outside. The label paper P on which the image is printed in the internal space 30A of the casing 30 is discharged to the outside of the casing 30, via the discharge port 33.

An operation panel 114 (see FIG. 2) is provided on the front surface 30F of the casing 30. The operation panel 114 is positioned, for example, at a location above the discharge port 33. A user is capable of performing input, by using the operation panel 114, for operating the printing apparatus 1 or for performing a variety of kinds of settings.

A sub frame 22 is provided at a front part of the internal space 30A of the casing 30. A tank 34 is provided in a space surrounded by the sub frame 22. The tank 34 is, for example, a container having a shape of a rectangular parallelepiped and stores an ink in the inside of the tank 34. The tank 34 is capable of supplying the ink, by a non-illustrated tube, with respect to a discharging head 38 (to be described later on). In the present embodiment, the tank 34 can be made of a cartridge type which is detachably installable with respect to the casing 30. The tank 34 may include, for example, four tanks which store, respectively, inks of four basic colors and one tank or a plurality of tanks storing an ink of a special color. The inks of the basic colors are exemplified, for example, by a cyan ink, a yellow ink, a magenta ink and a black ink. On the other hand, the ink of the special color is an ink of which color is different from those of the inks of the basic colors, and is exemplified, for example, by a red ink, a green ink, a blue ink, etc.

A holder 35, a tensioner 45, a conveying roller 36, a discharging roller 40, a discharging head 38 which is for example of a serial head type, a side guide 50, an attraction-by-suction belt 51, a pressing roller unit 60, a fixing unit 39, a platen 46, a reading sensor (reader) 29, a cutter unit (cutter) 26 and the above-described tank 34 are arranged in the internal space 30A of the casing.

A partition wall 41 is provided on a rear part of the internal space 30A. The partition wall 41 and the lower casing 32 defines a roll paper accommodating space 30C. The roll paper accommodating space 30C is a space separated from the discharging head 38, etc. Roll paper 37 as an example of the print medium W is accommodated in the roll paper accommodating space 30C.

As depicted in FIG. 3, the roll paper 37 is the label paper P which is wound in a roll shape, the label paper P including a plurality of labels Pb and a mount Pa which has a band shape and on which the plurality of labels Pb are affixed. Each of the plurality of labels Pb are affixed to the mount Pa at equal spacing distances therebetween. A release property is applied to a surface of the mount Pa. Note that the materials of each of the mount Pa and the plurality of labels Pb are not particularly limited. Thus, the wording of the "label paper" and the "roll paper" respectively means any label sheet and any roll sheet made of any appropriate material(s), such as resin.

The holder 35 extending in the left-right direction Dy is provided in the roll paper accommodating space 30C. The holder 35 corresponds to an "attachment part". The roll paper 37 is attachable to the holder 35. The holder 35 supports the roll paper 37 to be rotatable about the axis of the holder 35. A pair of side guides 25 which are apart from each other in the left-right direction Dy is provided on the holder 35. One of the pair of side guides 25 and the other of the pair of side guides 25 are configured to be movable in a mutually approaching direction and in a mutually separating direction in the left-right direction Dy. The user makes the pair of side guides 25 to make contact, respectively, with both ends in the left-right direction Dy of the roll paper 37 which is attached to the holder 35, in accordance with the width (a size in the left-right direction Dy) of the roll paper 37. With this, the roll paper 37 is positioned with respect to the holder 35.

A gap 42 is defined between the above-described partition wall 41 and a rear surface 30R of the casing 30, namely, at a location above a rear end of the roll paper 37. The label paper P constructing the roll paper 37 is drawn upward from the rear end of the roll paper 37, which is attached to the holder 35, by the rotations of the conveying roller 36 and the discharging roller 40, and is guided to the tensioner 45 via the gap 42. Note that the conveying roller 36 corresponds to a "conveyor".

The tensioner 45 is arranged at a location above the roll paper accommodating space 30C in the internal space 30A. The tensioner 45 is arranged at a location above the partition wall 41. The tensioner 45 is a roller which is supported to be rotatable about an axis parallel to the left-right direction Dy. The tensioner 45 is urged rearward by, for example, an urging member such as a spring, etc. The tensioner 45 makes contact with the label paper P drawn upward from the roll paper 37 and guides the label paper P to be curved forward.

The conveying roller 36 is arranged in front of the tensioner 45 in the internal space 30A. The conveying roller 36 includes a conveyance roller 36A and a pinch roller 36B. Each of the conveyance roller 36A and the pinch roller 36B is supported to be rotatable about an axis parallel to the left-right direction Dy. A driving power by a conveying motor 131 is transmitted to the conveyance roller 36A, which in turn causes the conveyance roller 36A to rotate. With this, the conveyance roller 36A and the pinch roller 36B convey the label sheet P frontward, while nipping the label paper P between the conveyance roller 36A and the pinch roller 36B.

The side guide 50 is arranged, in the internal space 30A, at a location which is above the tensioner 45 and which is on the rear side with respect to the conveying roller 36. The side guide 50 is a pair of guides which are apart from each other in the left-right direction Dy, and which make contact, respectively, with the both ends in the left-right direction Dy of the label paper P which is being conveyed frontward, thereby positioning the label paper P in the left-right direction Dy. The side guide 50 is made to be movable along the left-right direction Dy by, for example, a rack-and-pinion mechanism.

The discharging roller 40 is arranged, in the internal space 30A, at a location in front of the conveying roller 36. The discharging roller 40 includes a discharge roller 40A and a pinch roller 40B. Each of the discharge roller 40A and the pinch roller 40B is supported to be rotatable about an axis parallel to the left-right direction Dy. A driving power by a conveying motor 132 is transmitted to the discharge roller 40A, which in turn causes the discharge roller 40A to rotate. With this, the discharge roller 40A and the pinch roller 40B convey the label sheet P frontward, while nipping the label paper P between the discharge roller 40A and the pinch roller 40B.

The discharging head 38 is arranged, in the internal space 30A, at a location in front of the conveying roller 36. The discharging head 38 has a plurality of nozzles 38*a*. Each of the plurality of nozzles 38*a* discharges or ejects a droplet of ink (ink droplet) with respect to the label paper P supported by the attraction-by-suction belt 51 which is arranged at a location in front of the conveying roller 36 and below the discharging head 38. With this, print condition information (to be described later on) is printed on a label Pb of the plurality of labels Pb of the label paper P. Note that in the present embodiment, the discharging head 38 corresponds to a "printer".

The attraction-by-suction belt 51 is constructed of two pulleys 52 and 53 which are apart from each other in the front-rear direction Dx and each of which is rotatable about an axis parallel to the left-right direction Dy and an endless belt 54 stretched between the two pulleys 52 and 53. The pulley 52 is rotated by a driving power from a non-illustrated motor. By the rotation of the pulley 52, the endless belt 54 is rotated. A plurality of through holes is formed in the endless belt 54. A fan 55 provided in the attraction-by-suction belt 51 is operated, thereby generating a negative pressure at a location below the endless belt 54. With this, the label paper P is attracted to the endless belt 54 by the suction via the plurality of through holes. In such a manner, the attraction-by-suction belt 51 conveys the label paper P frontward, while attracting the label paper P thereto by suction.

The pressing roller unit 60 is arranged, in the internal space 30A, at a location in front of the discharging head 38. The pressing roller unit 60 is supported by a head frame 24, together with the discharging head 38. The pressing roller unit 60 has a pressing roller 61. The head frame 24 is movable along the up-down direction Dz. By the movement of the head frame 24 in the up-down direction Dz, the discharging head 38 is made movable between a predetermined discharge position and a separated position which is separated (away) upward from the attraction-by-suction belt 51 compared to the discharge position. Accompanying with this, the pressing roller 61 of the pressing roller unit 60 is made movable between a contact position at which the pressing roller 61 makes contact with the label paper P and a separated position at which the pressing roller 61 is separated (away) upward from the label paper P. In a case that the discharging head 38 is positioned at the discharge position, the pressing roller 61 is positioned at the contact position.

The fixing unit 39 is arranged, in the internal space 30A, at a location in front of the discharging head 38 and the pressing roller unit 60 and on the rear side with respect to the discharge roller 40. The fixing unit 39 is, for example, an ultraviolet ray irradiating device. An UV lamp 47 is provided in the inside of the fixing unit 39. The fixing unit 39 irradiates an ultraviolet ray generated by the UV lamp 47 onto the ink on the label Pb of the label paper P. A resin contained in the ink irradiated with the ultraviolet ray is cured to thereby cause a pigment contained in the ink to be fixed to the label Pb. Note that the fixing unit 39 is not limited to or restricted by the ultraviolet ray irradiating device. For example, in a case that the ink contains thermoplastic resin fine particles, the fixing unit 39 may be a heater which has an IR lamp as a heat generating member.

The platen 46 is arranged, in the internal space 30A, at a location in front of the discharging head 38 and the attraction-by-suction belt 51. A rear part of the platen 46 faces the fixing unit 39. A front part of the platen 46 faces the discharge roller 40A. The platen 46 supports the label paper P which is conveyed frontward by the attraction-by-suction belt 51.

The reading sensor 29 is arranged at an intermediate location of the conveying route of the label paper P. Specifically, the reading sensor 29 is arranged in front of the discharging roller 40. In the reading sensor 29, a light that is emitted from a light source such as an LED, etc., is reflected by the label paper P. The reflection light is collected to a line sensor by a gradient index lens. The line sensor outputs an electric signal depending on intensity of the reflection light received. Such a reading sensor 29 is capable of reading print condition information Ip (to be described later on) printed on the label Pb of the label paper P.

The cutter unit 26 is arranged in front of the reading sensor 29. The cutter unit 26 has a cutter carriage 27 and a cutter 28 mounted on the cutter carriage 27. The cutter carriage 27 moves in the left-right direction Dy by a non-illustrated belt driving mechanism, etc. Accompanying with the movement of the cutter carriage 27, the cutter 28 also moves in the left-right direction Dy. By the movement of the cutter 28, a part, of the label paper P, which is located between labels Pb of the plurality of labels Pb and is located between the discharging roller 40 and the discharge port 33 is cut along the left-right direction Dy. Namely, the cutter unit 26 cuts the label paper P drawn out from the roll paper 37.

As depicted in FIG. 2, the discharging head 38 has a plurality of driving elements 125. Each of the plurality of driving elements 125 is a piezoelectric element, a heating element, an electrostatic actuator, etc., is provided to correspond to one of the plurality of nozzles 38*a* of the discharging head 38, and applies, to the ink, a pressure for discharging the ink droplet from the one of the plurality of nozzles 38*a*.

In addition to the above-described components, the printing apparatus 1 is further provided with a controller 150. The controller 150 corresponds to a "computer", and is provided with: an interface 151; an arithmetic part 152 having a receiving part (receiver) 152*a*; and a memory 153. The interface 151 receives a variety of kinds of data, such as image data, from an external apparatus 200 including a computer, a camera, a communication network, a recording medium, a display, a printer, etc. The image data is, for example, raster data indicating an image to be printed on the print medium W, etc. Note that the controller 150 may be constructed of a single apparatus or device, or may be configured such that a plurality of devices is arranged in a dispersed manner and that the plurality of devices cooperate to perform an operation of the printing apparatus 1.

The memory 153 stores information regarding a size of a setting label Pb1 and a plurality of pieces of print condition information Ip (to be described in detail later on), etc. The memory 153 is a memory accessible from the arithmetic part 152 and has a RAM and a ROM. The RAM temporarily stores a variety of kinds of data which are, for example, data received from the external apparatus 200 such as the image data, and data converted by the arithmetic part 152, etc. The ROM stores a printing program for performing a variety of kinds of data processing, predetermined data, etc. Note that the printing program may be stored, for example, in an external storage medium which is different from the memory 153 and which is accessible from the arithmetic part 152, such as, for example, a CD-ROM, etc.

The arithmetic part 152 includes at least one circuit which is, for example, a processor such as a CPU, an integrated circuit such as an ASIC, etc. The arithmetic part 152 executes the printing program to thereby control respective parts or components and to thereby executes various operations such as a printing operation. In the present embodiment, the arithmetic part 152 corresponds to the "computer" and a "print controller". Further, the receiving part 152*a* of the arithmetic part 152 receives an instruction regarding exchange of the roll paper 37. In this case, a thickness of the roll paper 37 from the axial core of the roll paper 37 to the outer circumferential surface of the roll paper 37 may be detected by a sensor, and a result of the detection may be transmitted to the receiving part 152*a*; alternatively, a total conveyance amount of the label paper P may be calculated, and a result of the calculation may be transmitted to the receiving part 152*a*.

The controller 150 is electrically connected to the conveying motors 131 and 132 via a conveyance driving circuit 133, and controls the driving of each of the conveying motors 131 and 132. With this, the conveyance of the label paper P by the conveying roller 36 and the discharging roller 40 is controlled. Further, the controller 150 is electrically connected to a scanning motor 143 via a scanning driving circuit 146, and controls the driving of the scanning motor 143. With this, the movement of the discharging head 38 is controlled. Furthermore, the controller 150 is electrically connected to each of the plurality of driving elements 125 via a discharging head driving circuit 126. The controller 150 outputs a control signal of each of the plurality of driving elements 125 to the discharging head driving circuit 126; the discharging head driving circuit 126 generates a driving signal based on the control signal and outputs the driving signal to each of the plurality of driving elements 125. Each of the plurality of driving elements 125 is driven in accordance with the driving signal to thereby cause the ink droplet to be discharged from one of the plurality of nozzles 38*a* corresponding thereto.

Further, the controller 150 receives input information from the operation panel 114 so as to execute a predetermined processing and controls the operation of each of the fixing unit 39 and the cutter unit 26. Furthermore, the controller 150 receives a result of reading by the reading sensor 29.

In the printing apparatus 1 having the above-described configuration, the controller 150 obtains the image data from the external apparatus 200 and executes the printing operation based on the image data. In this case, the controller 150 causes the ink to be discharged from the discharging head 38 onto the label Pb of the label paper P in a printing pass, while moving the discharging head 38 in the direction parallel to the left-right direction Dy. Further, the controller 150 conveys the label paper P frontward in the front-rear direction Dx in a conveying operation. In such a manner, the printing apparatus 1 alternately repeats the printing pass and the conveying operation. With this, an image according to the image data is printed on the label Pb of the label paper P.

Figure 4:
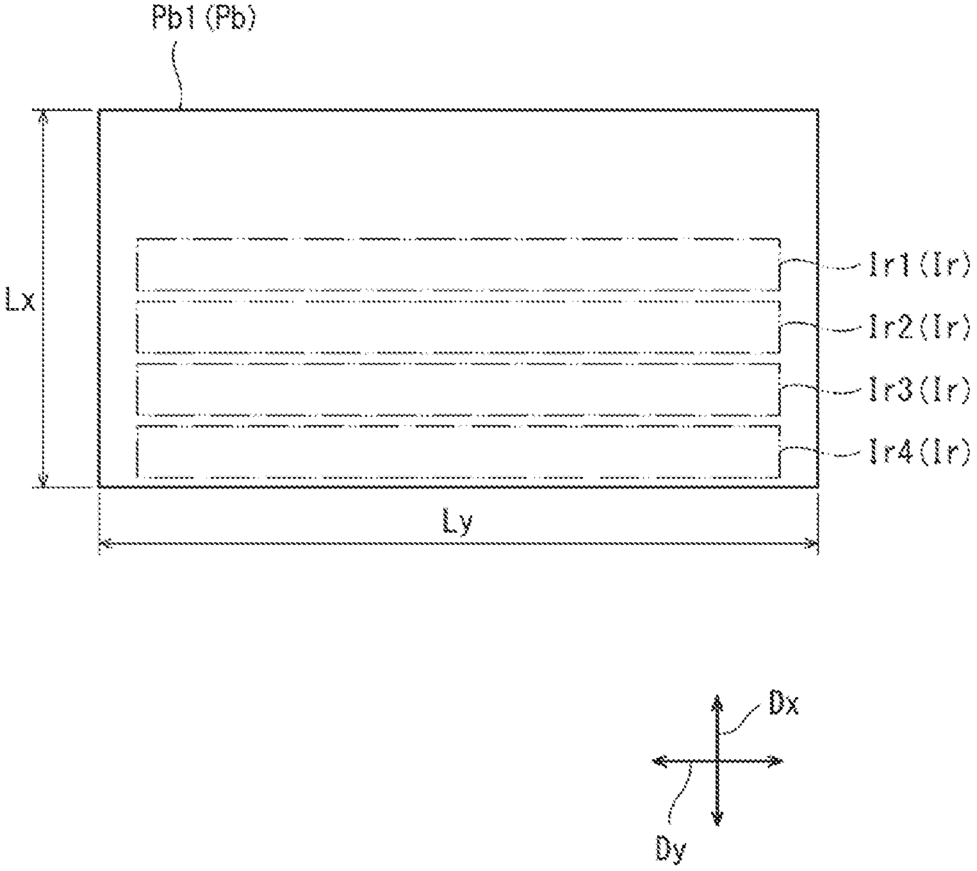
FIG. 4 is a view depicting a condition print area in a label in which print condition information is to be printed.
Figure 5:
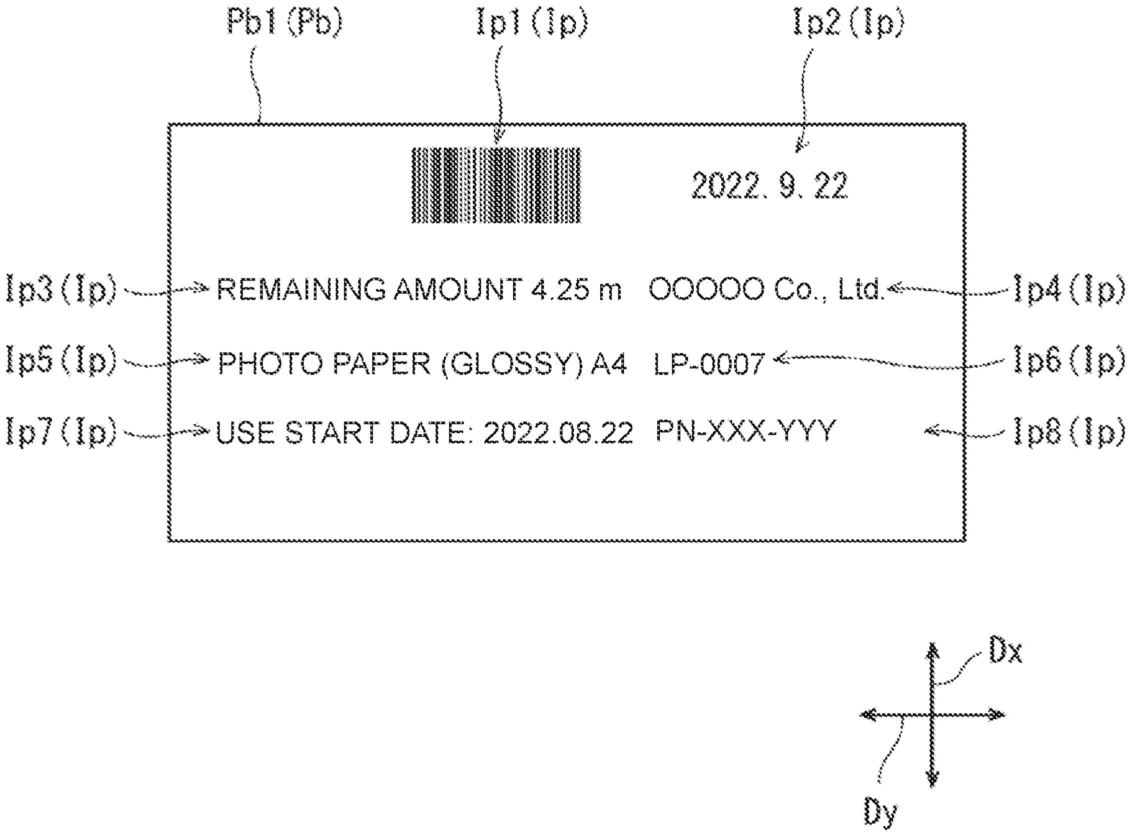
FIG. 5 is a view depicting a label on which a plurality of pieces of the print condition information is printed.
Figure 6A:
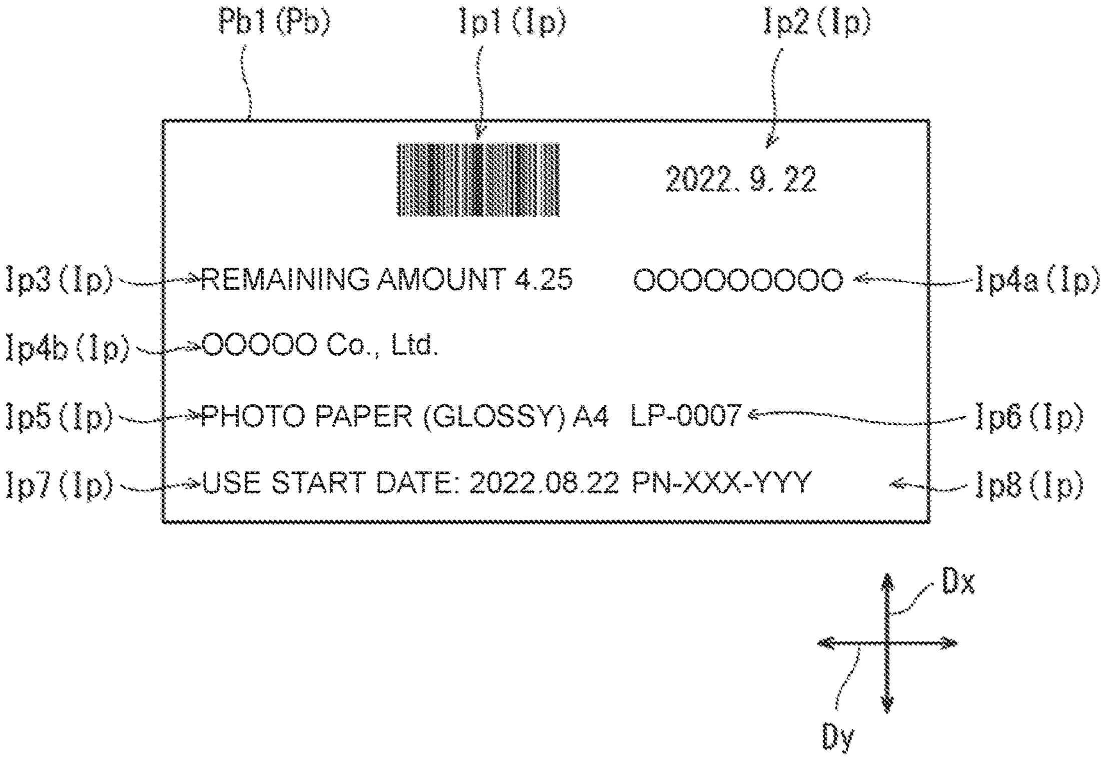
FIG. 6A is a view depicting a modification of the label of FIG. 5.
Figure 6B:
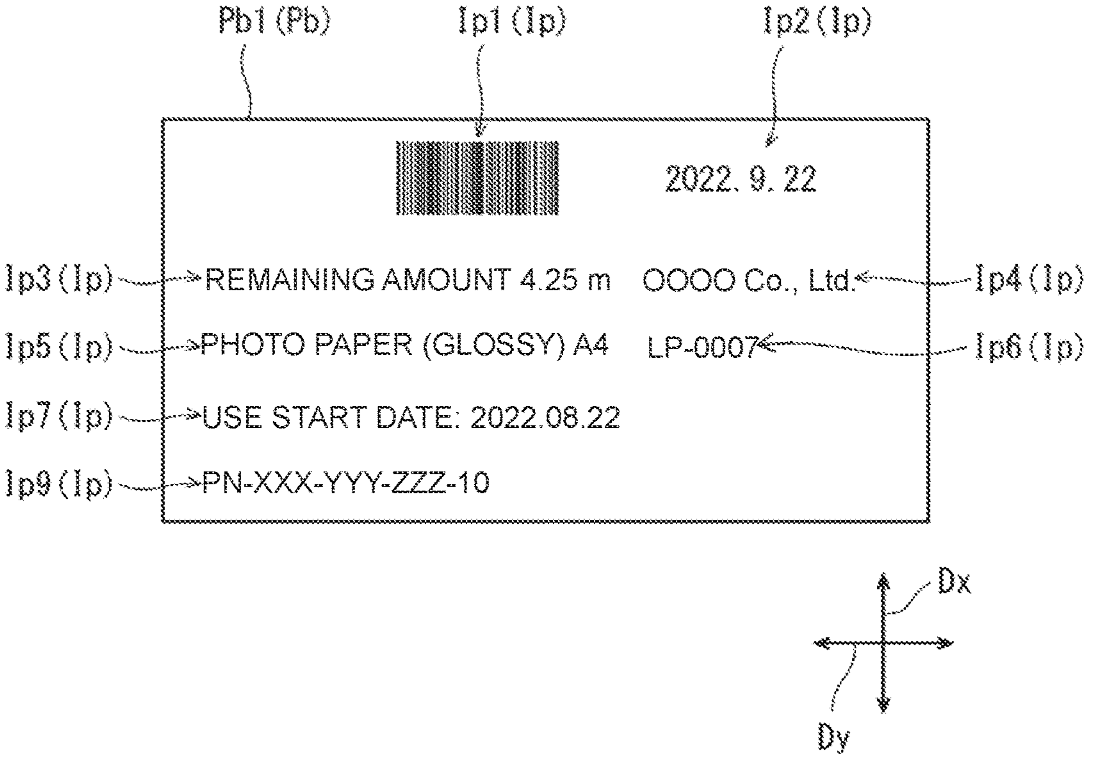
FIG. 6B is a view depicting another modification of the label of FIG. 5.

In the following, a processing of printing the print condition information to the label Pb of the label paper P will be explained. FIG. 4 is a view depicting a condition print area Ir in the label Pb in which print information condition Ip is to be printed. FIG. 5 is a view depicting a label Pb1 on which a plurality of pieces of print condition information Ip is printed. FIG. 6A is a view depicting a modification of the label Pb1 of FIG. 5, and FIG. 6B is a view depicting another modification of the label Pb1 of FIG. 5. Note that the reference numeral of a label on which the print condition information Ip is printed is made to be "Pb1" for the purpose of discriminating from a label on which an ordinary image, etc. (information different from the print condition information Ip) is printed. In the following, the label Pb1 is referred to as a "setting label Pb1 (label for setting Pb1)".

As depicted in FIG. 4, the setting label Pb1 is formed to have, for example, a rectangular shape. In the setting label Pb1, a size in a direction parallel to the front-rear direction Dx is "Lx", and a size in a direction parallel to the left-right direction Dy is "Ly". In the setting label Pb1 in FIG. 4, a relationship: the size Lx<the size Ly is satisfied. The present disclosure, however, is not limited to this; a label satisfying a relationship: the size Lx>the size Ly may be adopted. Note that the size and the shape of the setting label Pb1 may be made same as a size and a shape of the label Pb.

A plurality of condition printing areas Ir configured to allow the plurality of pieces of print condition information Ip depicted in FIG. 5 to be printed thereon is provided on the setting label Pb1. Each of the plurality of condition printing areas Ir extends, for example, along a direction parallel to the left-right direction Dy. In the setting label Pb1 of FIG. 4, four condition printing areas Ir1 to Ir4 are depicted, as an example. Note, however, that the number of the condition printing area Ir provided on the setting label Pb1 is not limited to four, and may be less than four or not less than five.

The print condition information Ip includes, for example, six pieces of print condition information Ip3 to Ip8. Print condition information Ip1 and print condition information Ip2 of FIG. 5 are printed at a location on the one end-side in the front-rear direction Dx in the setting label Pb1. The print condition Ip1 is, for example, a bar code including predetermined information. Specifically, the print condition information Ip1 is a bar code (that is, bar-coded information) configured such that information in each of the respective pieces of print condition information Ip2 to Ip8 can be read by a bar code reader. Further, the print condition information Ip2 is, for example, information indicating a date on which each of the plurality of pieces of print condition information Ip is printed on the setting label Pb1. A print position on the setting label Pb1 of each of the print condition information Ip1 and the print condition information Ip2 is not changed based on the shape, etc., of the setting label Pb1, unlike regarding each of the six pieces of print condition information Ip3 to Ip8 (to be described in the following). On the other hand, a print position of each of the six pieces of print condition information Ip3 to Ip8 may be changed based on the shape, etc., of the setting label Pb1. A detailed explanation therefor will be given as follows.

In FIG. 5, for example, the print condition information Ip3 is information indicating a remaining amount (total amount) of the label paper P, the print condition information Ip4 is information indicating a supplier of the printing apparatus 1 and the print condition information Ip5 is information indicating a kind of paper of the label Pb. Further, for example, the print condition information Ip6 is information indicating the type (model name) of the printing apparatus 1, the print condition information Ip7 is information indicating the date on which the roll paper 37 is attached to the printing apparatus 1 and is started to be used, and the print condition information Ip8 is information indicating a manufacture ID number given to each printing apparatus 1.

In a case that the controller 150 prints the six pieces of print condition information Ip3 to Ip8 on the setting label Pb1, the controller 150 reads out the six pieces of print condition information Ip3 to Ip8 from the memory 153. Further, the controller 150 causes the six pieces of print condition information Ip3 to Ip8 to be printed in the condition print area Ir of a single line or a plurality of lines in the setting label Pb1 based on any one of the shape of the setting label Pb1, the size of the setting label Pb1, and the shape and size of the setting label Pb1 (that is, based on the shape and/or the size of the setting label Pb1). Namely, the controller 150 uses the discharging head 38 so as to print the six pieces of print condition information Ip3 to Ip8 in the condition print area Ir of a single line or a plurality of lines in the setting label Pb1 based on the size of the settling label Pb1, and/or uses the discharging head 30 so as to print the six pieces of print condition information Ip3 to Ip8 in the condition print area Ir of a single line or a plurality of lines in the setting label Pb1 based on the shape of the settling label Pb1.

Specifically, at first, the controller 150 executes a processing of determining as to whether or not one piece or a plurality of pieces of the print condition information Ip is or are accommodated in the condition print area Ir of a single line in the setting label Pb1. Specifically, the controller 150 determines as to whether or not the print condition information Ip3 and the print condition information Ip4 are accommodated together in the condition print area Ir1. In this case, the controller 150 tentatively arranges the print condition information Ip3 and the print condition information Ip4 in this order from position on the one end-side in the left-right direction Dy (the left end-side in FIG. 5) to a position on the other end-side in the left-right direction Dy (the right end-side in FIG. 5) of the condition print area Ir1. In this situation, in a case that the print condition information Ip3 and the print condition information Ip4 are accommodated together in the condition print area Ir1, the controller 150 executes a processing of printing the print condition information Ip3 and the print condition information Ip4 together in the condition print area Ir1, as depicted in FIG. 5.

In contract, in a case that the print condition information Ip3 and the print condition information Ip4 are not accommodated together in the condition print area Ir1, the controller 150 executes a processing of causing the print condition information Ip4 on the other end-side in the condition print area Ir1 to be printed in a divided manner in the condition print area Ir1 and the condition print area Ir2, as depicted in FIG. 6A. In this case, the controller 150 divides the print condition information Ip4 into two parts which are a part Ip4*a* and a remaining part Ip4*b* so that the part Ip4*a* is accommodated in the condition print area Ir1, and causes the part Ip4*a* of the print condition information Ip4 to be printed in the condition print area Ir1 and causes the remaining part Ip4*b* of the print condition information Ip4 to be printed in the condition print area Ir2. Further, in the above-described case, the print condition information Ip5 and the print condition information Ip6 are printed in the condition print area Ir3, unlike in FIG. 5, and the print condition information Ip7 and the print condition information Ip8 are printed in the condition print area Ir4, unlike in FIG. 5. Note that a processing of determining as to whether or not one piece of the print condition information Ip is to be printed in the condition print area Ir of the single line is also executed in a similar manner as that described above. Further, a dividing point at which the print condition information Ip4 is divided into the part Ip4*a* and the remaining part Ip4*b* is arbitrary. Furthermore, in FIG. 6A, although an aspect wherein the remaining part of the print condition information Ip4 is printed on the one end-side in the left-right direction Dy of the condition print area Ir2, the present disclosure is not limited to this. It is acceptable that the remaining part of the print condition information Ip4 is printed on the other end-side in the left-right direction Dy of the condition print area Ir2.

Here, in a case that the plurality of pieces of print condition information Ip is not accommodated in the condition print area Ir of the single line, it is acceptable to print at least one piece of the print condition information Ip of the plurality of pieces of print condition information Ip in the condition print area Ir of another line, unlike in the above-described processing.

Specifically, in a case of printing print condition information Ip9, as depicted in FIG. 6B, of which information amount (namely, the number of letters) is longer than the print condition information Ip8 exemplified in FIG. 5, the controller 150 does not cause the print condition information Ip9 to be printed in the condition print area Ir3, but rather causes the print condition information Ip9 to be printed in a condition print area Ir4 of a line next to the line of the condition print area Ir3. Note that in FIG. 6B, an aspect wherein the print condition information Ip9 is printed on the one end-side in the left-right direction Dy of the condition print area Ir4 is exemplified, the present disclosure is not limited to this. It is acceptable that the print condition information Ip9 is printed on the other end-side in the left-right direction Dy of the condition print area Ir4.

Figure 7:
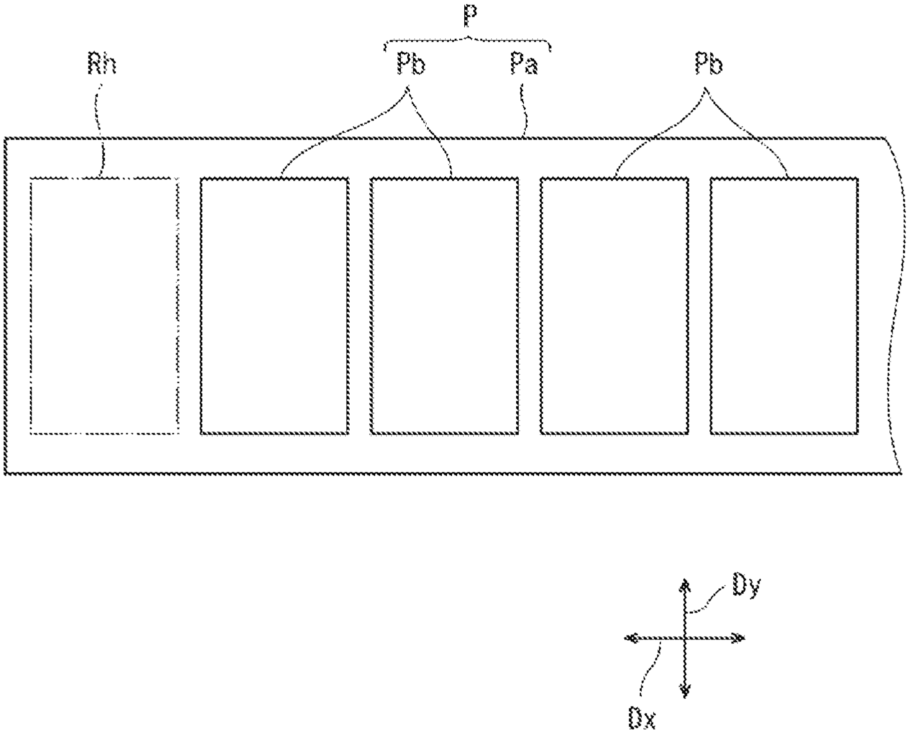
FIG. 7 is a view depicting an affixing space which is provided in a label paper and to which the label having the print condition information printed thereon is to be affixed.
Figure 8:
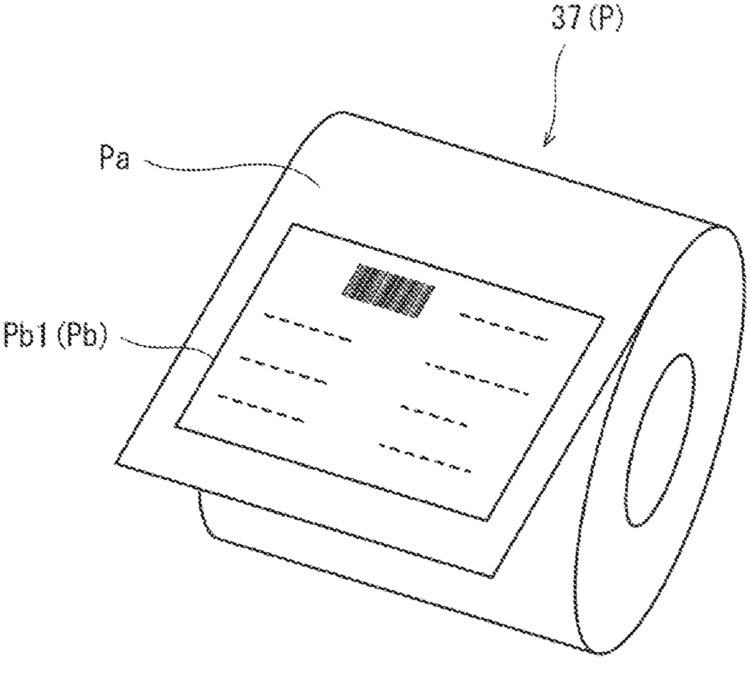
FIG. 8 is a view depicting a roll paper for replacement to which the label having the print condition information printed thereon is affixed.

FIG. 7 is a view depicting an affixing space Rh which is provided in the label paper P and to which the setting label Pb1 having the print condition information Ip printed thereon is to be affixed. FIG. 8 is a view depicting a roll paper 37 for replacement to which the setting label Pb1 is affixed.

As described above, after the setting label Pb1 on which the print condition information Ip is printed is peeled off, by the user, from the mount Pa of the label paper P before being replaced (that is, old or used label paper P), and the setting label Pb1 is affixed, by the user, to a label paper P (roll paper 37) for replacement (that is, new label paper P). Specifically, a head part of the label paper P for replacement is provided with a predetermined affixing space Rh. A label Pb (namely, a non-printed label Pb for which the printing has not been performed yet) is not affixed to the affixing space Rh. In a case that the user exchanges the roll paper 37, the user affixes the setting label Pb1 on which the print condition information Ip has been printed to the affixing space Rh, as depicted in FIG. 8. Further, the user attaches, to the holder 35, the roll paper 37 in which the setting label Pb1 is affixed to the affixing space Rh.

In a case of reading the print condition information Ip printed on the setting label Pb1, the controller 150 causes the conveying roller 36 to convey the label paper P so that the condition print area Ir is positioned at a predetermined reading position Rp. An irradiation area of the light by the light source of the reading sensor 29 has a range by which is it possible to read all of the print condition information Ip in the setting label Pb1. In a case that the condition print area Ir is positioned at the reading position Rp, the controller 150 causes the reading sensor 29 to read the print condition information Ip, and receives the result of the reading. Further, the controller 150 sets the print condition based on the print condition Information Ip which has been read. A specific example of the setting of the print condition includes, for example, a processing in which the controller 150 rewrites a numerical value of a print density stored in the memory 153 as a memory (storage device), and the controller 150 changes a numerical value in a color conversion table which is used for the printing, etc.

Figure 9:
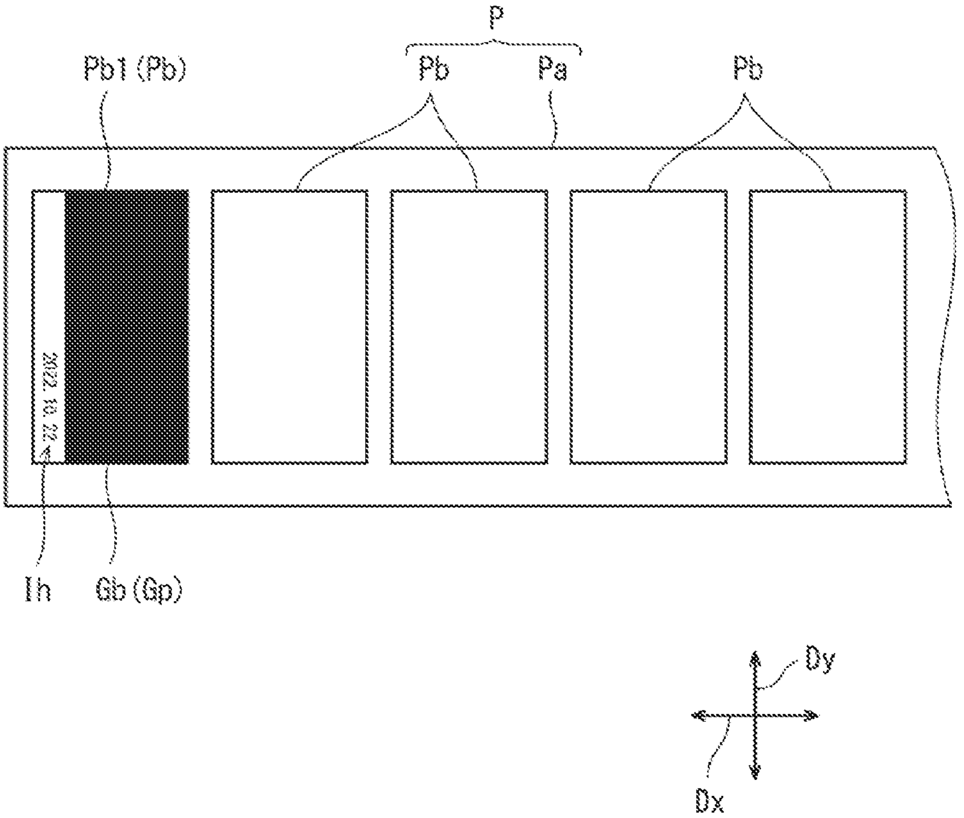
FIG. 9 is a view depicting a black-painted image which is printed on the label after the print condition information of the label has been read.

FIG. 9 is a view depicting a black-painted image Gb which is printed on the setting label Pb1 after the print condition information Ip of the setting label Pb1 has been read.

After the controller 150 executes the processing of setting the print condition based on the result of the reading as described above, the controller 150 causes the conveying roller 36 to convey the label paper P so that the condition print area Ir of the setting label Pb1 is positioned at a printing position Pp at which the discharging head 38 performs printing. In this case, since the discharging head 38 is positioned on the rear side with respect to the reading sensor 29, the controller 150 causes the conveying roller 36 to perform reverse conveyance of the label paper P, after the setting of the print condition. Further, the controller 150 causes the discharging head 38 to print a predetermined image Gp in an area including the condition print area Ir in the setting label Pb1, as depicted in FIG. 9. With this, the user is capable of avoiding any mix-up between the setting label Pb1 and other labels Pb.

As depicted in FIG. 9, the predetermined image Gp is, for example, a black-painted image Gp which is printed while being overlapped (overlaid) on the print condition information Ip. The predetermined image Gp may include date-and-time information (time information) Ih indicating the date and/or time on which the controller 150 sets the print condition (date and/or time of setting of the print condition).

In order to avoid any mix-up between the setting label Pb1 and the other labels Pb, it is acceptable to execute the following processing, rather than printing the predetermined image Gp.

After the processing of setting the print condition as described above, the controller 150 causes the conveying roller 36 to convey the label paper P so that the condition print area Ir in the setting label Pb1 is positioned at a cutting position Cp at which cutting by the cutter unit 26 is possible, without causing the conveying roller 36 to perform the reverse conveyance of the label paper P. In this case, since the cutter unit 26 is positioned at the location in front of the reading sensor 29, the controller 150 causes the conveying roller 36 to convey the label paper P (to subject the label paper P to a normal conveyance). Further, the controller 150 causes the cutter 28 of the cutter unit 26 to cut a part, of the label paper P, which includes the condition print area Ir, at the cutting position Cp. Also by the foregoing processing, it is possible to avoid any mix-up between the setting label Pb1 and the other labels Pb. Note that on the setting label Pb1 cut off from the label paper P, the predetermined image Gp is not printed.

Figure 10:
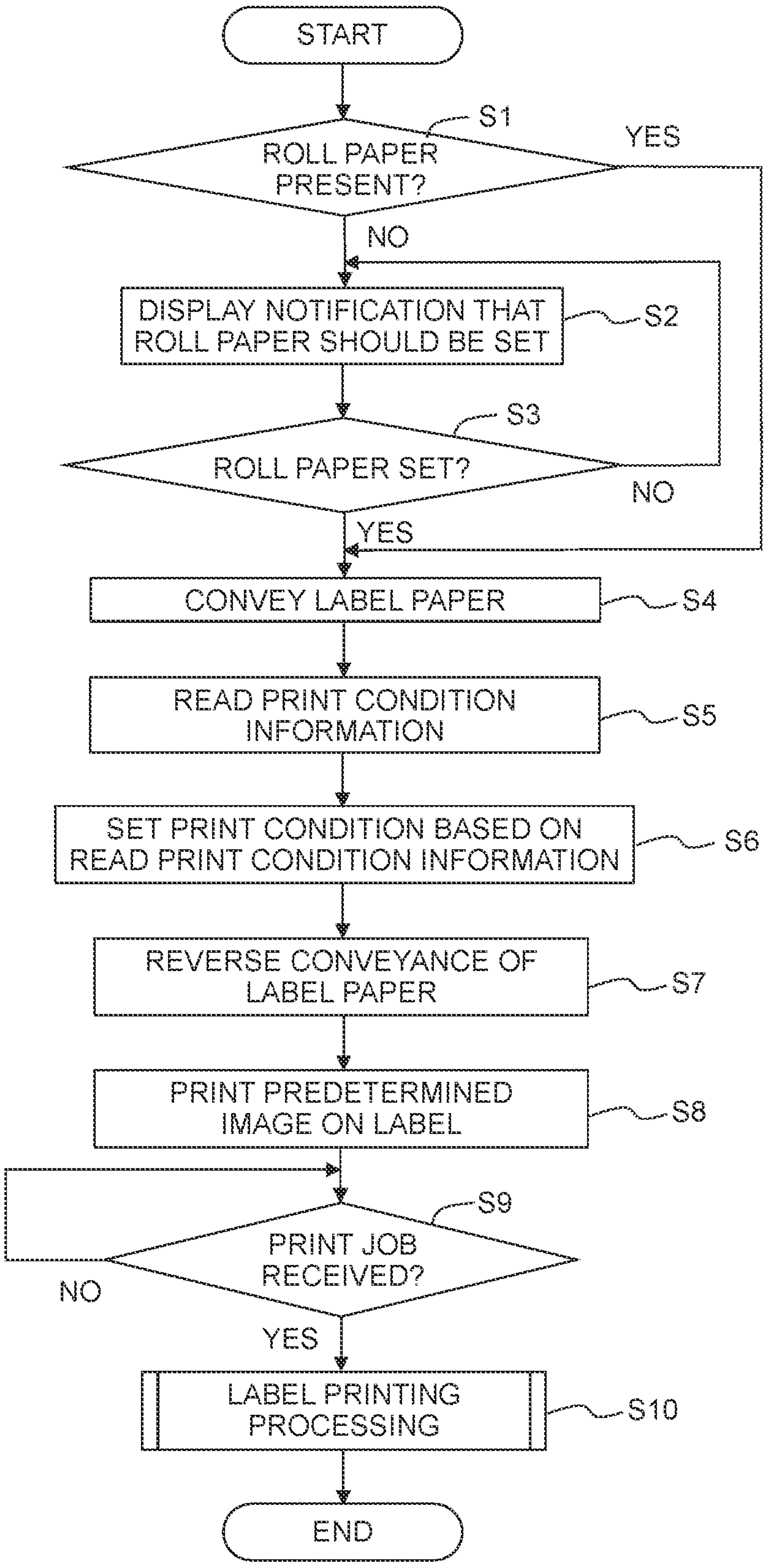
FIG. 10 is a flow chart of a main routine indicating a label printing processing by a controller.
Figure 11:
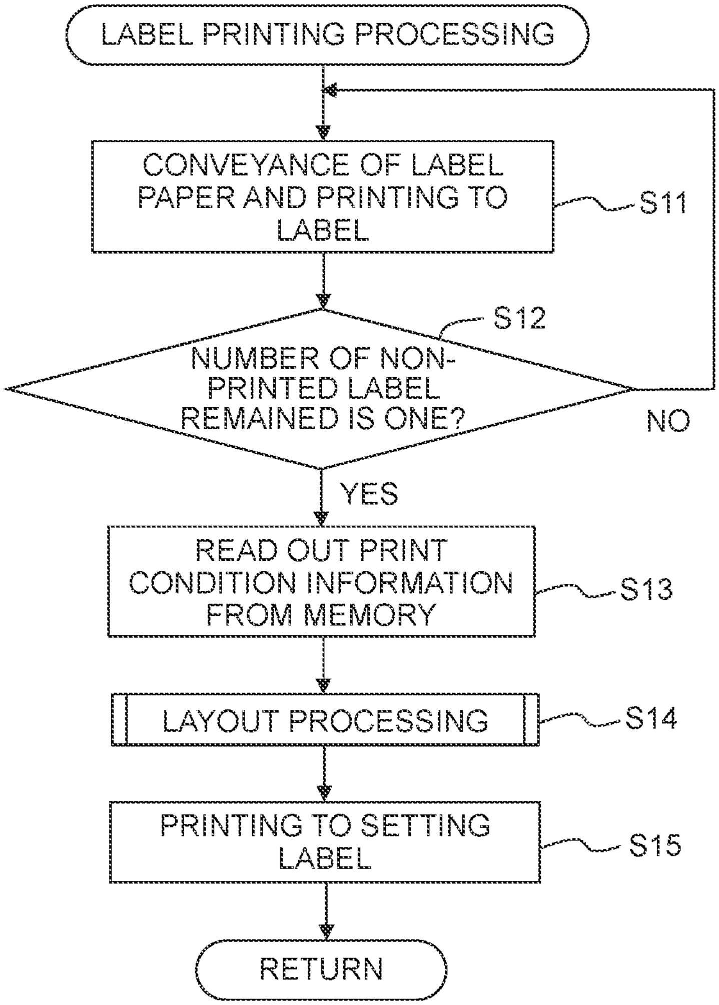
FIG. 11 is a flow chart of a sub routine of the label printing processing of FIG. 10.
Figure 12:
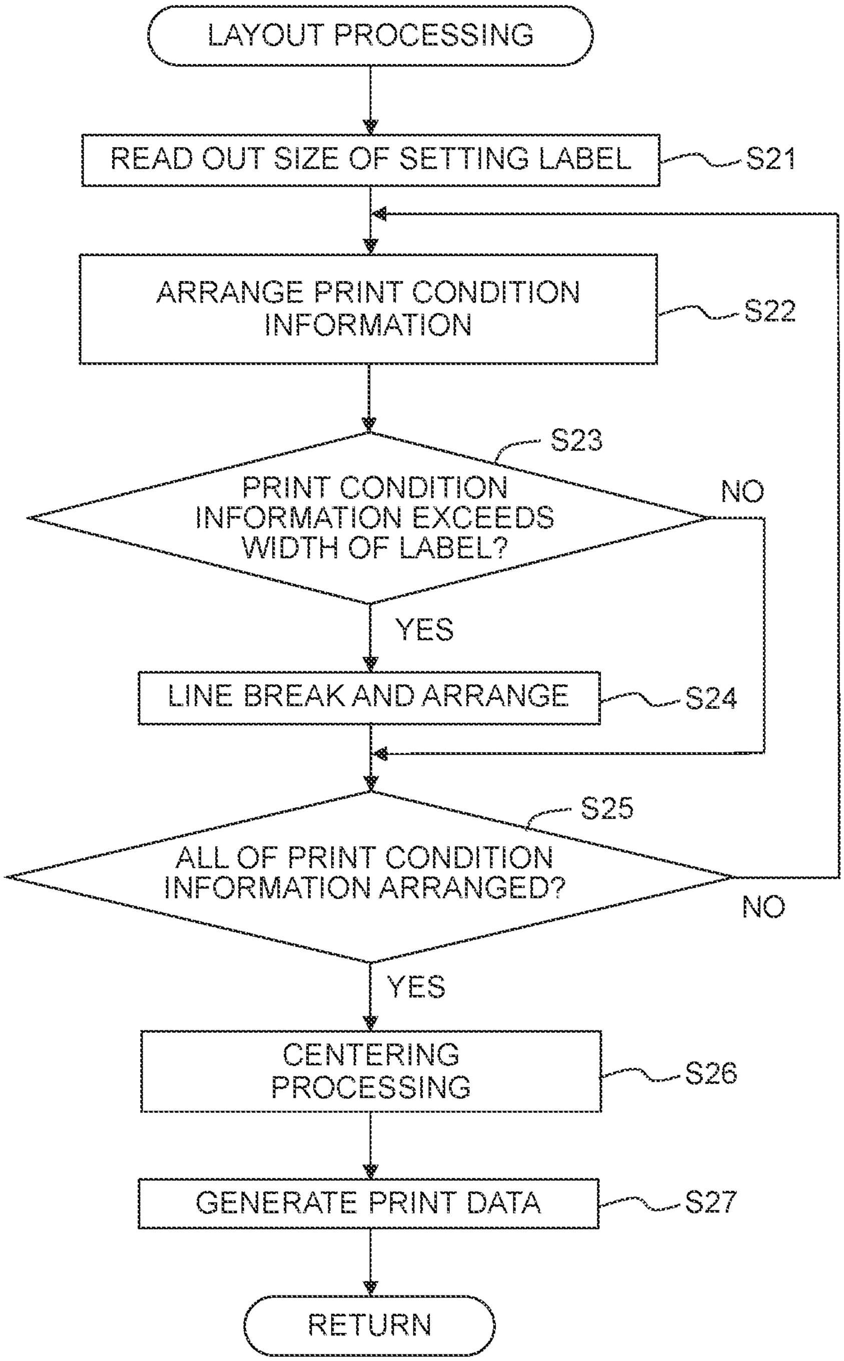
FIG. 12 is a flow chart of a sub routine of a layout processing of FIG. 11.

FIG. 10 is a flow chart of a main routine indicating a printing processing of the setting label Pb1 by the controller 150. FIG. 11 is a flow chart of a sub routine of the label printing processing of FIG. 10. FIG. 12 is a flow chart of a sub routine of a layout processing of FIG. 11.

In the following, an explanation will be given on the premise that the label printing is performed by using the roll paper 37 in which the setting label Pb1 having the print condition information Ip printed thereon is affixed to the mount Pa, as depicted in FIG. 8. For example, the controller 150 receives a print job, etc., and the controller 150 thereby executes the processing following the flow chart indicated in FIG. 10. As indicated in FIG. 10, at first, the controller 150 determines as to whether or not the label paper P is present, namely, as to whether or not the roll paper 37 is set to (attached to) the holder 35, based on a result of detection by a sensor (step S1). In a case that the roll paper 37 is not set in the holder 35 (step S1: NO), the controller 150 causes the operation panel 114 to display a notification that the roll paper 37 should be set in the holder 35 (step S2).

Next, the controller 150 determines as to whether or not the roll paper 37 is set to the holder 35 by the user, based on the result of detection by the sensor (step S3). In a case that the roll paper 37 is not set to the holder 35 by the user (step S3: NO), the controller 150 continues the processing of step S2.

On the other hand, in a case that the roll paper 37 is set to the holder 35 by the user (step S3: YES) or in a case that the roll paper 37 has been set to the holder 35 (step S1: YES), the controller 150 causes the conveying roller 36 to convey the label paper P (step S4). In this case, the controller 150 causes the conveying roller 36 to convey the label paper P so that the condition print area Ir in the setting label Pb1 is positioned at the reading position Rp.

Next, in a case that the condition print area Ir is positioned at the reading position Rp, the controller 150 causes the reading sensor 29 to read the print condition information Ip, and receives a result of the reading (step S5). Further, the controller 150 sets the print condition based on the read print condition information Ip being the result of reading which has been received (step S6).

Next, the controller 150 causes the conveying roller 36 to perform the reverse conveyance of the label paper P so that the condition print area Ir of the setting label Pb1 is positioned at the print position Pp at which the discharging head 36 performs the printing (step S7). Further, the controller 150 causes the discharging head 38 to print the predetermined image Gp in the area including the condition print area Ir in the setting label Pb1 (step S8).

Next, the controller 150 determines as to whether or not the print job is received from the external apparatus 200 (step S9). In a case that the print job has not been received (step S9: NO), the controller 150 stands by until the print job is received; in a case that the print job is received (step S9; YES), the controller 150 executes a label printing processing as follows (step S10).

In the label printing processing, the controller 150 executes a processing of causing the conveying roller 36 to convey the label Pb of the label paper Pup to the printing position Pp and a processing of causing the discharging head 38 to perform printing on the label Pb at the print position Pp (step S11). Next, the controller 150 determines, for example, as to whether or not the number of the non-printed label remained is one (step S12). For example, the receiving part 152*a* receives, as information regarding replacement of the roll paper 37, a result of detection of a thickness of the roll paper 37 detected by a sensor when the number of the non-printed label remained is one; in a case that the above-described information (that is, the information regarding the replacement of the roll paper 37) is received by the receiving part 152*a*, the controller 150 executes a processing of step S14 (to be described later on), namely, a layout processing of printing the print condition information Ip in the condition print area Ir of the setting label Pb1.

In a case that the number of the non-printed label remained is not one (step S12: NO), the controller 150 returns to the processing of step S11. On the other hand, in a case that the number of the non-printed label remained is one (step S12: YES), the controller 150 reads out, from the memory 153, print condition information Ip which is to be printed on the setting label Pb1 to be affixed to a roll paper 37 for replacement (a new roll paper different from the roll paper 37 used in the processing of this flow chart) (step S13). Afterwards, the controller 150 executes the following layout processing (step S14).

In the layout processing, at first, the controller 150 reads out the size of the setting label Pb1 from the memory 153 (step S21). Then, the controller 150 tentatively arranges the print condition information Ip in the condition print area Ir1 of the setting label Pb1 (step S22). The controller 150 determines as to whether or not the print condition information Ip exceeds the width of the label, namely, determines as to whether or not the print condition information Ip is not accommodated in the condition print area Ir1 (step S23).

In a case that the print condition information Ip is not accommodated in the condition print area Ir1 (step S23: YES), the controller 150 performs a line break for the print condition information Ip and arranges the print condition information Ip, namely, arranges, for example, the print condition information Ir by dividing the print condition information Ir into two parts, in a similar manner as explained above with reference to FIG. 6A (step S24).

After the processing of step S24 or in a case that the print condition information Ip is accommodated in the condition print area Ir1 (step S23: NO), the controller 150 determines as to whether or not all of the print condition information Ip is arranged in the condition print areas Ir (step S25). In a case that all of the print condition information Ip is not arranged in the condition print areas Ir (step S25: NO), the controller 150 returns to the processing of step S22 and repeats the processing of step S22 and thereafter.

On the other hand, in a case that all of the print condition information Ip is arranged in the condition print areas Ir (step S25: YES), the controller 150 executes a centering processing of arranging each piece of all of the print condition information Ip arranged in one of the respective condition print areas Ir corresponding thereto to be at the center in the left-right direction Dy in the corresponding condition print area Ir (step S26). Then, the controller 150 generates print data including all of the print condition information Ip each of which is arranged in one of the respective condition print areas Ir corresponding thereto (step S27). Afterwards, the controller 150 executes the processing of step S15 of FIG. 11, namely, the processing of causing the discharging head 38 to perform printing with respect to the setting label Pb1 based on the above-described print data. With this, all the processings are ended. Note that the above-described centering processing is not a processing which is essential.

Figure 13:
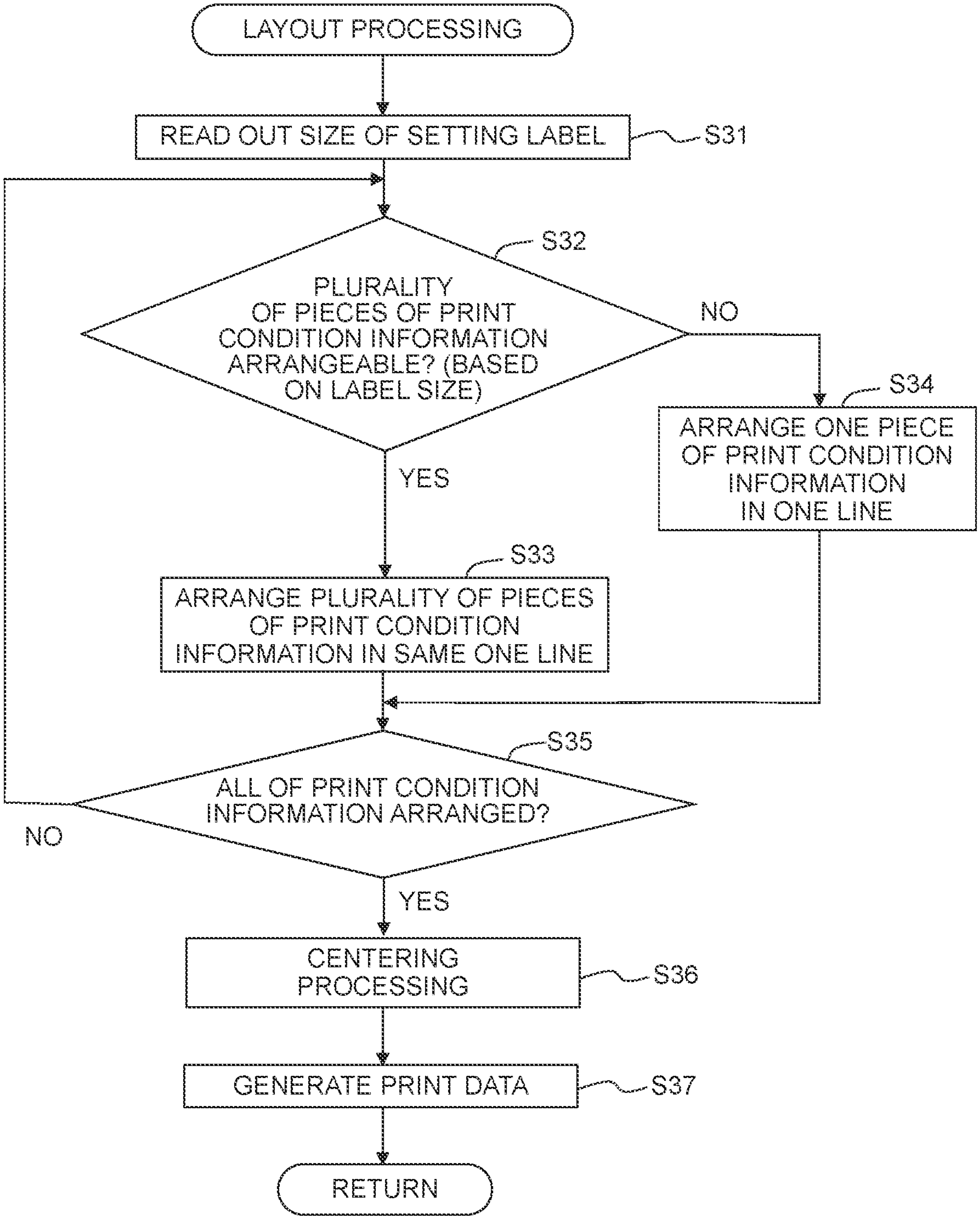
FIG. 13 is a flow chart of a modification of the flow chart of FIG. 12.

It is acceptable to executes a layout processing as follows, instead of executing the layout processing depicted in FIG. 12. FIG. 13 is a flow chart of a modification of the flow chart of FIG. 12.

In the layout processing of FIG. 13, at first, the controller 150 reads out a size of the setting label Pb1 from the memory 153 (step S31). Next, the controller 150 determines as to whether or not a plurality of pieces of print condition information Ip can be arranged in the condition print area Ir1, based on the size of the setting label Pb1 which has been read (step S32). In a case that the plurality of pieces of print condition information Ip can be arranged in the condition print area Ir1 (step S32: YES), the controller 150 arranges the plurality of pieces of print condition information Ip in the condition print area Ir1 which is a same line (same one line) (step S33). On the other hand, in a case that the plurality of pieces of print information Ip cannot be arranged in the condition print area Ir1 (step S32: NO), the controller 150 arranges one piece of print condition information Ip in the condition print area Ir1 and arranges a remaining piece of print condition information Ip in another condition print area Ir (step S34).

After the processing of step S33 and the processing of step S34, the controller 150 determines as to whether or not all of the print condition information Ip is arranged in the condition print areas Ir (step S35). In a case that all of the print condition information Ir is not arranged in the condition print areas Ir (step S35: NO), the controller 150 returns to the processing of step S32 and repeats the processing of step S32 and thereafter.

On the other hand, in a case that all of the print condition information Ip is arranged in the condition print areas Ir (step S35: YES), the controller 150 executes a centering processing of arranging each piece of all of the print condition information Ip arranged in one of the respective condition print areas Ir corresponding thereto to be at the center in the left-right direction Dy in the corresponding condition print area Ir (step S36). Then, the controller 150 generates print data including all of the print condition information Ip each of which is arranged in one of the respective condition print areas Ir corresponding thereto (step S37). Afterwards, the controller 150 executes the processing of step S15 of FIG. 11. With this, all the processings are ended.

As explained in the foregoing, according to the printing apparatus 1, since one piece or the plurality of pieces of the print condition information Ip is printed in the condition print area Ir of a single line or a plurality of lines in the setting label Pb1, it is possible to easily and appropriately set the print condition by reading the print condition information Ip in a case of replacing the roll paper 37. Further, the print condition information Ip is printed on the condition print area Ir based on any one of the shape of the setting label Pb1, the size of the setting label Pb1, and the shape and the size of the setting label Pb1. This enables the user to easily and visually grasp the print condition information Ip, compared to a case that the print condition information is printed on the condition print area not based on the size of the label.

Further, in the present embodiment, in a case that the respective plurality of pieces of the print condition information Ip are not accommodated together in the condition print area Ir of the single line, the controller 150 divides the print condition information Ip into two parts. This enables the user to easily and visually grasp the print condition information Ip, compared to a case that the print condition information Ip is not divided into two parts and that the size of the letters of the print condition information Ip is made small.

Furthermore, in the present embodiment, in the case that the respective plurality of pieces of print condition information Ip are not accommodated together in the condition print area Ir of the single line, it is also possible to print at least one piece of the plurality of pieces of print condition information Ip in another condition print area Ir. This enables the user to easily and visually grasp the print condition information Ip, compared to a case that the print condition information Ip is printed with the size of the letters of the print condition information Ip being made small.

Moreover, in the present embodiment, in a case that the condition print area Ir is positioned at the reading position Rp, the controller 150 causes the reading sensor 29 to read the print condition information Ip and receives the result of the reading. Further, the controller 150 sets the print condition based on the print condition information Ip which has been read. With this, it is possible to save, for the user, a time and effort for inputting the print condition.

Further, in the present embodiment, the predetermined image Gp is printed in the area including the condition print area Ir in the setting label Pb1. With this, the user is capable of avoiding any mix-up between the setting label Pb1 and other labels Pb.

Furthermore, in the present embodiment, the predetermined image Gp may include the date-and-time information Ih indicating the date and/or the time on which the controller 150 sets the print condition. With this, the user is capable of easily recognize the date and/or the time on which the print condition has been set by the controller 150.

Moreover, in the present embodiment, the predetermined image Gp may be the black-pained image Gp which is printed while being overlapped on the print condition information Ip. With this, the user is capable of more easily avoiding any mix-up between the setting label Pb1 and other labels Pb.

Further, in the present embodiment, it is acceptable to cause the cutter 28 of the cutter unit 26 to cut a part, of the label paper P, which includes the condition print area Ir in the label paper P at the cutting position Cp. Also with this, it is possible to avoid any mix-up between the setting label Pb1 and the other labels Pb.

Furthermore, in the present embodiment, the user affixes the setting label Pb1 on which the print condition information Ip has been printed to the affixing space Rh. With this, after the roll paper 37 in which the setting label Pb1 is affixed to the affixing space Rh is attached to the holder 35 (namely, the roll paper 37 is replaced), it is possible to set the print condition by reading the print condition information Ip of the setting label Pb1.

Moreover, in the present embodiment, in a case that the receiving part 152*a* receives the instruction information regarding replacement of the roll paper 37, the controller 150 executes the processing of printing the print condition information Ip in the condition print area Ir of the setting label Pb1. With this, it is possible to print the print condition information Ip at a suitable print timing.

Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiment, although the roll paper 37 which is constructed of the label paper P wound in the roll shape is used as an example of the print medium W, the present disclosure is not limited to this. A modification of the print medium W is exemplified, for example, by a roll paper in which any label(s) are not affixed to the mount, such as a roll paper which is like a receipt, etc., (namely, a roll paper which is not separated into a mount and labels).

Further, the above-described embodiment is configured so that the print condition information Ip is printed on the condition print area Ir based on any one of the shape of the setting label Pb1, the size of the setting label Pb1, and the shape and the size of the setting label Pb1. The present disclosure, however, is not limited to this; in a case that, for example, the print condition information Ip is to be printed with respect to the roll paper such as receipt, the shape of the roll paper is uniform in many cases. Accordingly, it is acceptable to print the print condition information Ip based on the size (width, etc.,) of the roll paper as the print medium.

Furthermore, although the configuration provided with the cutter 28 mounted on the cutter carriage 27 is adopted as the cutter unit 26 in the above-described embodiment, the present disclosure is not limited to this. It is also acceptable to adopt a cutter unit having a cutter which is longer than the width (size in the left-right direction Dy) of the label paper P and which is capable of cutting the label paper P by moving in the up-down direction Dz.

Moreover, although the size and the shape of the setting label Pb1 are made to be same as the size and the shape of the label Pb in the above-described embodiment, the present disclosure is not limited to this. It is also acceptable to make the size and the shape of the setting label Pb1 to be different from the size and the shape of the label Pb.

Further, although the black-painted image Gb is indicated as an example of the predetermined image Gp in FIG. 9 of the above-described embodiment, the present disclosure is not limited to this. The predetermined image Gp may be an image which is capable of hiding or concealing the print condition information Ip. For example, the predetermined image Gp may be a double line or a triple line, etc., drawn over the print condition information Ip, or may be a predetermined mark printed while being overlapped (overlaid) on the print condition information Ip, and the like. Furthermore, although the black-painted image Gb including the date-and-time information Ih indicating the date and/or the time on which the controller 150 sets the print condition is indicated as an example of the predetermined image Gp in FIG. 9 of the above-described embodiment, the present disclosure is not limited to this. It is also acceptable to print only the date-and-time information Ih indicating the date and/or the time on which the controller 150 sets the print condition, without printing the black-painted image Gb as the predetermined image Gp. Note that the date-and-time information Ih may be obtained from a built-in clock, or from the external apparatus 200. Moreover, the external apparatus 200 may be connected to the Internet, and may obtain the date-and-time information on the Internet.

Furthermore, although the font size of the print condition information Ip is made to be same among the respective condition print areas Ir in the above-described embodiment, the present disclosure is not limited to this. The font size may be made different among the respective condition print areas Ir.

Moreover, although the printing apparatus 1 is of a serial head system in the above-described embodiment, the present disclosure is not limited to this. The printing apparatus 1 may be of a line head system.

Further, although the printing apparatus 1 is exemplified by the ink-jet printer in the above-described embodiment, the present disclosure is not limited to this. The printing apparatus 1 may be another printer such as a laser printer, a thermal printer, etc. The laser printer is provided with a printing part. The printing part of the laser printer is provided with: an image carrier such as a photosensitive drum, a photosensitive belt, etc.; a charging part configured to charge the image carrier in a contact manner or in a non-contact manner; an exposing part which uses a laser semiconductor, etc., so as to form an electrostatic latent image on the image carrier which has been charged (so as to perform a so-called exposure); a toner cartridge and/or a developer cartridge configured to supply a toner to the image carrier on which the electrostatic latent image is formed; a transferring part, such as a transfer roller, a transfer belt, etc., which is configured to transfer a toner image developed on the image carrier directly onto a print medium; and a fixing part, such as a fixing roller, a fixing belt, etc., which is configured to thermally fix, to the print medium, the toner transferred to the print medium. The printing apparatus 1 may also be a laser printer of an intermediate transfer system, without being limited to the above-described laser printer of the direct tandem type; in the laser printer of the intermediate transfer system, a toner image developed on the image carrier is transferred onto an intermediate transfer belt, and then the transfer part is used so as to transfer the toner image from the intermediate transfer belt to the print medium. Further, the thermal printer is provided with a printing part. The printing part of the thermal printer is provided with a thermal head and an ink ribbon. The thermal head makes contact with the ink ribbon; in a case that the ink of the ink ribbon is transferred to the print medium, a heating element corresponding thereto is caused to generate heat, thereby transferring the ink of the ink ribbon to the print medium.

Furthermore, although after the controller 150 executes the processing of setting the print condition, the controller 150 causes the conveying roller 36 to convey the label paper P so that the condition print area Ir in the setting label Pb1 is positioned at the cutting position Cp at which the cutting by the cutter unit 26 is possible, without conveying the label paper P reversely in the above-described embodiment. The present disclosure is not limited to this. It is also acceptable that, after the processing of setting the print condition, the controller 150 causes the conveying roller 36 to reversely convey the label paper P to such an extent that the condition print area Ir in the setting label Pb1 does not reach the print position Pp at which the printing by the discharging head 38 is performed, and that the controller 150 causes the conveying roller 36 to convey the label paper P so that the condition print area Ir in the setting label Pb1 is positioned at the cutting position Cp at which the cutting by the cutter unit 26 is possible. Alternatively, it is also acceptable that, after the processing of setting the print condition, the controller 150 causes the conveying roller 36 to convey the label paper P so that the condition print area Ir in the setting label Pb1 passes over the cutting position Cp at which the cutting by the cutter unit 26 is possible and to a location in front of the cutter unit 26. In this situation, the setting label Pb1 may temporarily protrude from the discharge port 33. Afterwards, it is acceptable that the controller 150 causes the conveying roller 36 to convey the label paper P reversely so that the condition print area Ir in the setting label Pb1 is positioned at the cutting position Cp at which the cutting by the cutter unit 26 is possible.

Moreover, it is also acceptable that after the controller 150 executes the processing of setting the print condition, the controller 150 causes the conveying roller 36 to reversely convey the label paper P so that the condition print area Ir of the setting label Pb1 is positioned at the print position Pp at which the printing by the discharging head 38 is performed; and that after the controller 150 causes the discharging head 38 to print the black-pained image Gb on the setting label Pb1, the controller 150 causes the conveying roller 36 to convey the label paper P so that the condition print area Ir is positioned at the cutting position Cp at which the cutting by the cutter unit 26 is possible. Since the black-pained image Gb is printed on the setting label Pb1 and also that the setting label Pb1 is cut from the label paper P, the user is capable of recognizing, more easily, the setting label Pb1 as being unnecessary.

Further, in the above-described embodiment, although the receiving part 152*a* may receive a result of detection of the thickness, of the roll paper 37, detected by the sensor, the thickness being the size from the axial core the roll paper 37 to the outer circumferential surface of the roll paper 37, or that the receiving part 152*a* may receive the result of calculation of the total conveyance amount of the label paper P, the present disclosure is not limited to this. The receiving part 152*a* may receive the instruction regarding replacement of the roll paper 37, by a pressing of a key by the user and/or an input via a touch panel by the user.

In the above-described embodiment, the print condition information Ip is printed on the setting label Pb1 of the old roll paper 37 and the setting label Pb1 on which the print condition information Ip has been printed is affixed to the affixing space Rh of new roll paper 37, in a case that the old roll paper 37 is replaced with the new roll paper 37. However, the timing of printing the print condition information Ip on the setting label Pb is not limited thereto. The printing of the print condition information on the print medium attached to the holder of the printing apparatus will be performed at any timing. Further, the setting label Pb1, of the old roll paper 37, on which the print condition information Ip has been printed may not be affixed to the new roll paper 37.

For example, the roll paper 37 in use (the number of non-printed label remained may not be one) will be detached from the printing apparatus 1, in a case for example that, the roll paper 37 in use is replaced with a roll paper 37 having different type (for example, the roll paper 37 of different width, different back ground color, etc.). In such a case, the print condition information Ip may be printed on the setting label Pb of the roll paper 37 in use. By doing so, in a case that the detached roll paper 37 is attached to the printing apparatus 1 again, the setting of the printing condition can be performed easily and appropriately by reading, with the reading sensor 29, the print condition information Ip printed on the setting label Pb. The casing 30 may have a cover defining the end of the roll paper accommodating space 30C, and the controller 150 may print the print condition information Ip on the setting label Pb based on the inputting of the information indicating opening of the cover, performed by a user via the operation panel 114. In such a case, the controller 150 may unlock the cover so that the cover is in an openable state, after completion of the printing of the print condition information Ip on the setting label Pb1.

Other than the above, the controller 150 may receive information indicating printing of the print condition information Ip on the setting label Pb1 of the roll paper 37 in use, from a user at any timing, and may perform printing of the print condition information Ip on the setting label Pb1. The user may input such information via, for example, the operation panel 114.

What is claimed is:

1. A printing apparatus comprising:

a holder configured such that a print medium wound in a roll shape is to be attached to the holder;

a printer configured to perform printing on the print medium;

a memory configured to store print condition information indicating a print condition regarding the print medium attached to the holder; and a controller configured to execute a processing of printing the print condition information in a condition print area of a single line or a plurality of lines on the print medium by using the printer; wherein:

the controller is configured to, in the processing of printing the print condition information, determine a layout of the print condition information in the condition print area based on at least one of a shape or a size of the print medium;

the print medium includes a roll paper being a label paper wound in a roll shape, the label paper including a mount and a plurality of labels affixed to the mount;

the controller is configured to execute the processing of printing the print condition information in the condition print area of the single line or the plurality of lines on at least one of the plurality of labels based on at least one of a shape or a size of the at least one of the plurality of labels; and the controller is configured to, in the processing of printing the print condition information, determine the layout of the print condition information in the condition print area based on the at least one of the shape or the size of the at least one of the plurality of labels, wherein the printing apparatus further comprises:

a conveyor configured to convey the label paper drawn out from the roll paper attached to the holder; and a reader arranged on a conveying route of the label paper, the reader being configured to read the print condition information printed on the at least one of the plurality of labels of the label paper, wherein the controller is further configured to execute:

a processing of causing the conveyor to convey the label paper so that the condition print area is positioned at a reading position;

a processing of causing the reader to read the print condition information in a case that the condition print area is positioned at the reading position;

a processing of setting a print condition based on the read print condition information;

a processing of causing, after the processing of setting the print condition, the conveyor to convey the label paper so that the condition print area is positioned at a print position; and a processing of causing the printer to further print a predetermined image on the condition print area positioned at the print position.

2. The printing apparatus according to claim 1, wherein the controller is configured to execute:

a processing of determining whether or not the print condition information is to be accommodated in a first line being the condition print area of the single line; and a processing of printing the print condition information by the printer in the first line and a second line in a manner that the print condition information is divided into a plurality of portions, the second line being the condition print area of the single line or the plurality of lines and being different from the first line, in a case that the print condition information is determined to be not to be accommodated in the first line being the condition print area of the single line.

3. The printing apparatus according to claim 1, wherein the print condition information includes a first information and a second information, and the controller is configured to execute:

a processing of determining whether or not the print condition information is to be accommodated in a first line being the condition print area of the single line; and a processing of printing the first information by the printer in the first line and printing the second information by the printer in a second line being the condition print area of the single line or the plurality of lines and being different from the first line, in a case that the print condition information is determined to be not to be accommodated in the first line being the condition print area of the single line.

4. The printing apparatus according to claim 1, wherein the predetermined image is an image including time information indicating a time and/or a date of setting of the print condition.

5. The printing apparatus according to claim 1, wherein the predetermined image is a black-painted image to be printed overlapped with the print condition information.

6. A printing apparatus comprising:

a holder configured such that a print medium wound in a roll shape is to be attached to the holder;

a printer configured to perform printing on the print medium;

a memory configured to store print condition information indicating a print condition regarding the print medium attached to the holder; and a controller configured to execute a processing of printing the print condition information in a condition print area of a single line or a plurality of lines on the print medium by using the printer; wherein:

the controller is configured to, in the processing of printing the print condition information, determine a layout of the print condition information in the condition print area based on at least one of a shape or a size of the print medium;

the print medium includes a roll paper being a label paper wound in a roll shape, the label paper including a mount and a plurality of labels affixed to the mount;

the controller is configured to execute the processing of printing the print condition information in the condition print area of the single line or the plurality of lines on at least one of the plurality of labels based on at least one of a shape or a size of the at least one of the plurality of labels; and the controller is configured to, in the processing of printing the print condition information, determine the layout of the print condition information in the condition print area based on the at least one of the shape or the size of the at least one of the plurality of labels, wherein the printing apparatus further comprises:

a conveyor configured to convey the label paper drawn out from the roll paper attached to the holder;

a reader arranged on a conveying route of the label paper, the reader being configured to read the print condition information printed on the at least one of the plurality of labels of the label paper; and a cutter configured to cut the label paper drawn out from the roll paper, wherein the controller is further configured to execute:

a processing of causing the conveyor to convey the label paper so that the condition print area is positioned at a reading position;

a processing of causing the reader to read the print condition information in a case that the condition print area is positioned at the reading position;

a processing of setting a print condition based on the read print condition information;

a processing of causing, after the processing of setting the print condition, the conveyor to convey the label paper so that the condition print area is positioned at a cut position; and a processing of causing the cutter to cut a part, of the label paper, including the condition print area positioned at the cut position.

7. The printing apparatus according to claim 1, wherein the label paper has an affixing space configured such that at least one of the plurality of labels is to be affixed to the affixing space, the print condition information being printed on the condition print area of the at least one of the plurality of labels.

8. The printing apparatus according to claim 1, further comprising a receiver configured to receive an instruction regarding replacement of the print medium, wherein the controller is configured to print the print condition information in the condition print area of the print medium in the processing of printing the print condition information, in a case that the controller receives the instruction regarding the replacement of the print medium.

9. A printing method of performing printing, by a printing apparatus, on a print medium wound in a roll shape and attached to a holder of the printing apparatus, the method comprising performing printing of print condition information indicating a print condition regarding the print medium attached to the holder in a condition print area of a single line or a plurality of lines, wherein:

the performing of printing of the print condition information includes determining a layout of the print condition information in the condition print area based on at least one of a shape or a size of the print medium, the print medium includes a roll paper being a label paper wound in a roll shape, the label paper including a mount and a plurality of labels affixed to the mount;

the performing of printing of the print condition information includes printing the print condition information in the condition print area of the single line or the plurality of lines on at least one of the plurality of labels based on at least one of a shape or a size of the at least one of the plurality of labels; and the performing of printing of the print condition information includes determining the layout of the print condition information in the condition print area based on the at least one of the shape or the size of the at least one of the plurality of labels, wherein the printing apparatus further includes:

a conveyor configured to convey the label paper drawn out from the roll paper attached to the holder; and a reader arranged on a conveying route of the label paper, the reader being configured to read the print condition information printed on the at least one of the plurality of labels of the label paper, the method further comprises:

causing the conveyor to convey the label paper so that the condition print area is positioned at a reading position;

causing the reader to read the print condition information in a case that the condition print area is positioned at the reading position;

setting a print condition based on the read print condition information;

causing, after the setting of the print condition, the conveyor to convey the label paper so that the condition print area is positioned at a print position; and causing the printing apparatus to further print a predetermined image on the condition print area positioned at the print position.

* * * * *